United States Patent
Chen et al.

(10) Patent No.: US 7,522,423 B2
(45) Date of Patent: Apr. 21, 2009

(54) MOUNTING DEVICE FOR EXPANSION CARDS

(75) Inventors: Yun-Lung Chen, Shenzhen (CN); Lin Ding, Shenzhen (CN); Jen-Chien Chiang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 362 days.

(21) Appl. No.: 11/306,464

(22) Filed: Dec. 29, 2005

(65) Prior Publication Data

US 2007/0175130 A1    Aug. 2, 2007

(51) Int. Cl.
*H05K 7/00* (2006.01)
(52) U.S. Cl. ........................... 361/728; 361/801
(58) Field of Classification Search ......... 361/756–759, 361/801, 802, 755, 796, 728; 312/223.1–223.2
See application file for complete search history.

(56) References Cited

U.S. PATENT DOCUMENTS

| | | | | |
|---|---|---|---|---|
| 5,694,291 | A * | 12/1997 | Feightner | 361/683 |
| 6,138,839 | A * | 10/2000 | Cranston et al. | 211/41.17 |
| 6,141,222 | A * | 10/2000 | Toor et al. | 361/726 |
| 6,377,445 | B1 * | 4/2002 | Davis et al. | 361/683 |
| 6,809,922 | B2 | 10/2004 | Lin et al. | |
| 6,960,720 | B2 * | 11/2005 | Wen-Lung | 174/50 |
| 2007/0206368 | A1 * | 9/2007 | Zhang et al. | 361/801 |
| 2007/0242442 | A1 * | 10/2007 | Dai | 361/801 |

* cited by examiner

*Primary Examiner*—Dean A. Reichard
*Assistant Examiner*—Yuriy Semenenko
(74) *Attorney, Agent, or Firm*—Wei Te Chung (57) ABSTRACT

A mounting device assembly includes an expansion card (70) with a securing clip (72), a panel (10) and a retention member (50). The panel has a supporting member (16). The retention member includes a fixing portion (51) and a curved tab (58) pivotably hooking the supporting member and suspending therefrom. The retention member is pivoted about the supporting member, so that the securing clip of the expansion card is sandwiched between the fixing portion of the retention member and the panel.

3 Claims, 9 Drawing Sheets

MOUNTING DEVICE FOR EXPANSION CARDS

FIELD OF THE INVENTION

The present invention relates to mounting devices, and more particularly to a mounting device for conveniently securing an expansion card to a computer enclosure.

DESCRIPTION OF RELATED ART

A typical computer includes expansion ports or slots for attaching expansion cards, for expanding the capabilities of the computer.

A conventional expansion card mounting apparatus includes a rear panel defining an opening, a retaining bracket slidably attached to the panel and including a main body and a pressing body. A fastening member is fixed to the retaining bracket. A support plate extends rearward from the panel adjacent the opening. A through opening is defined in the main body. A plurality of cutouts is defined in the pressing body. The fastening member includes a plurality of pressing clips extending through the cutouts to abut end portions of slot covers. An operation lever extends through the through opening of the retaining bracket to resiliently engage with the panel at the opening. Thus the end portions of the slot covers are securely sandwiched between the pressing body and the support plate.

However, it is inconvenient to use the fastening member to secure the expansion cards in a computer enclosure. When the expansion cards need to be removed, the fastening member of the mounting apparatus needs to be removed as well from the computer enclosure.

What is needed, therefore, is a locking device, which allows convenient securing of expansion cards in a computer enclosure.

SUMMARY OF INVENTION

A mounting device assembly includes an expansion card with a securing clip, a panel and a retention member. The panel has a supporting member. The retention member includes a fixing portion and a curved tab pivotably hooking the supporting member and suspending therefrom. The retention member is pivoted about the supporting member, so that the securing clip of the expansion card is sandwiched between the fixing portion of the retention member and the panel.

Other advantages and novel features will be drawn from the following detailed description of a preferred embodiment with attached drawings, in which:

DETAILED DESCRIPTION

Figure 1:
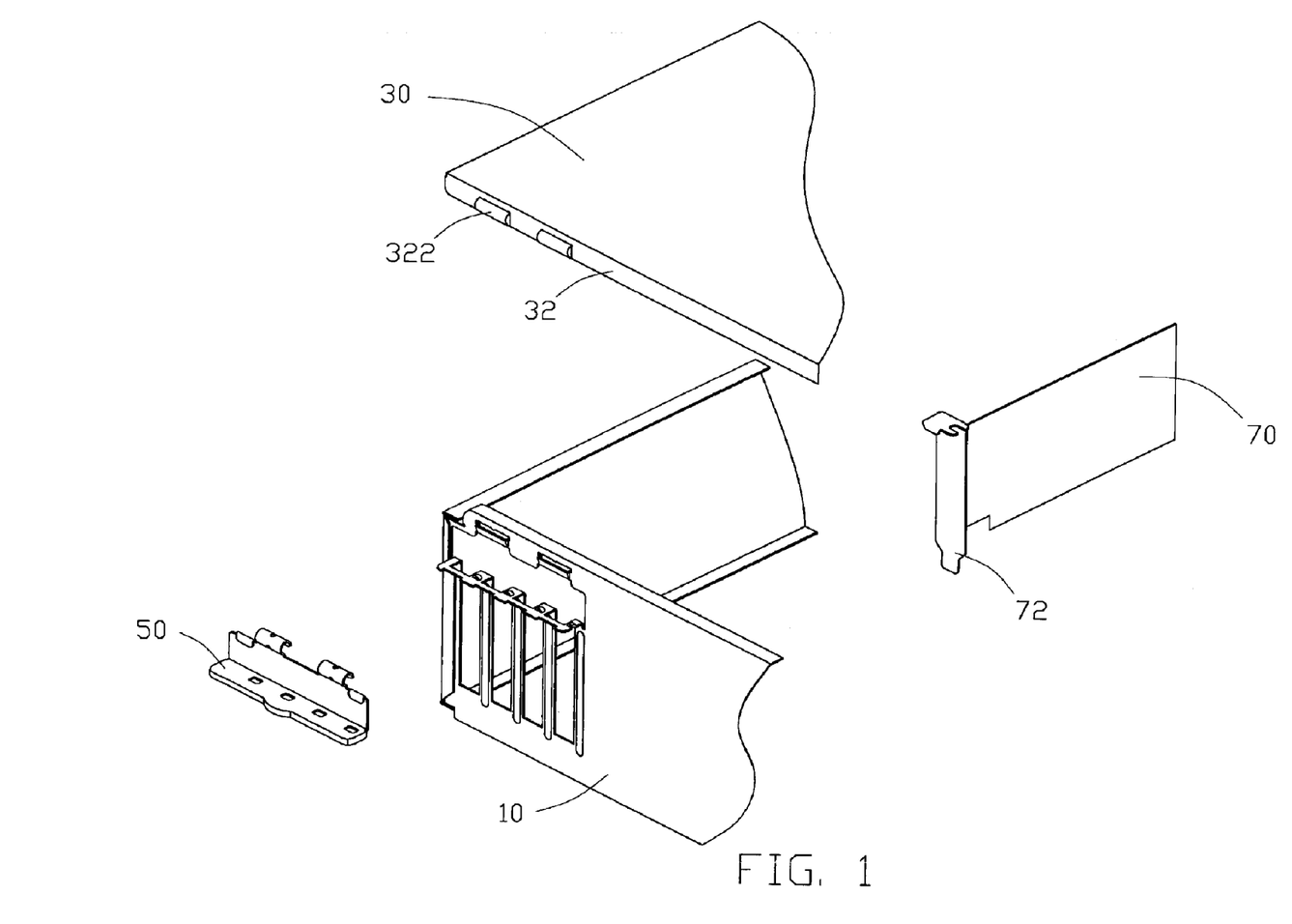
FIG. 1 is an exploded, isometric view of part of a mounting device for a expansion card of a preferred embodiment of the present invention, the mounting device including a back panel, a cover, and a retention member.

Referring to FIG. 1, a mounting device of a preferred embodiment of the present invention includes a back panel 10, a cover 30, and a retention member 50 for securing an expansion card 70. A cover flange 32 is formed at an edge of the cover 30, corresponding to a top edge of the back panel 10. Two covering portions 322 are formed on the cover flange 32. An L-shaped securing clip 72 is set on a side of the expansion card 70.

Figure 2:
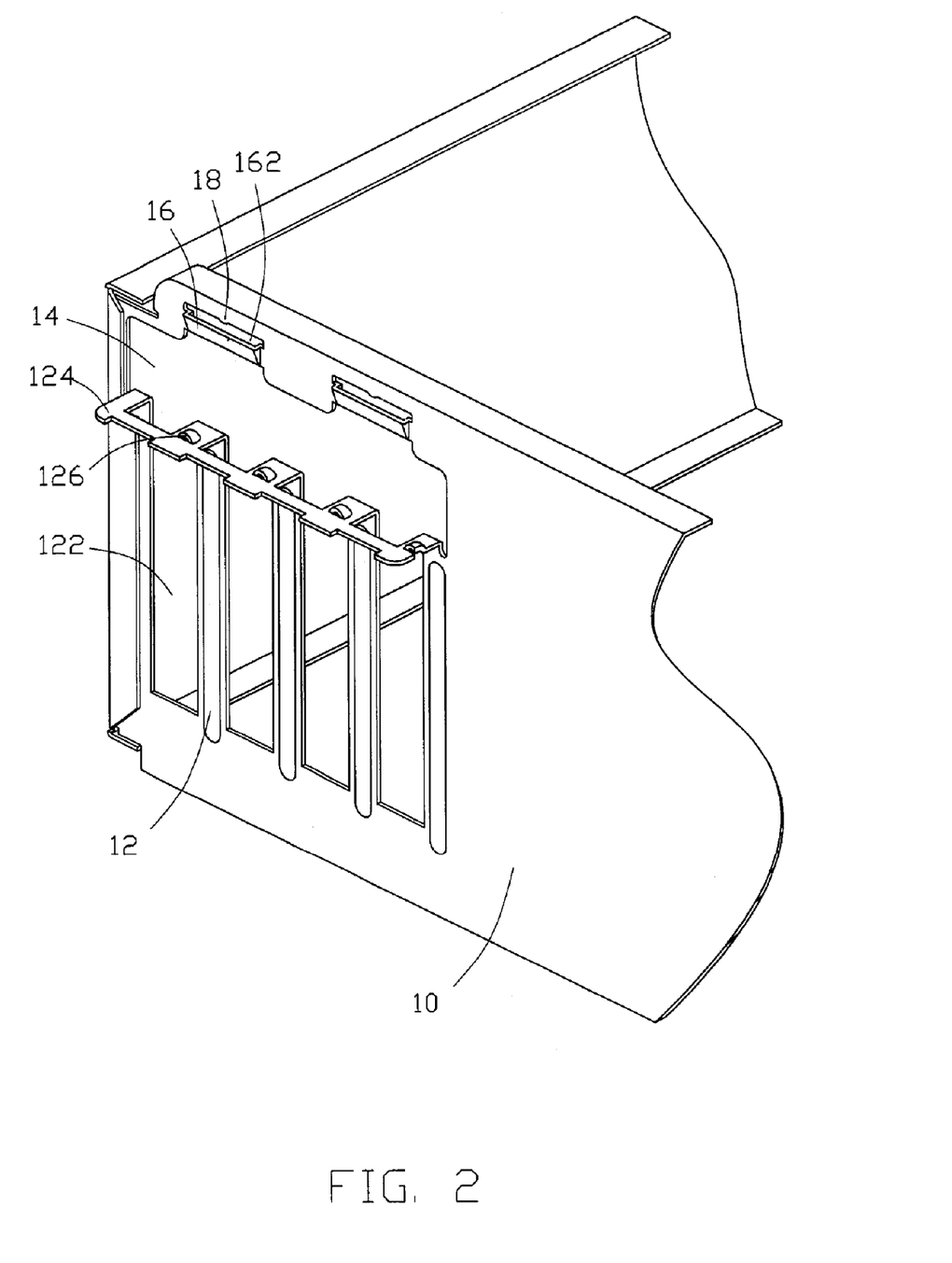
FIG. 2 is an isometric, enlarged view of part of the back panel of FIG. 1.

Referring also to FIG. 2, the back panel 10 has a barrier 12. A plurality of slots 122 is defined in the barrier 12. A top flange 124 is bent out from a top portion of the barrier 12. A plurality of protrusions 126 is formed on the top flange 124 of the barrier 12. The back panel 10 defines an opening 14 above the barrier 12. A pair of supporting members 16 is formed on the back panel 10, above the opening 14. The supporting members 16 are stamped slantwise from the back panel, thereby forming holding spaces 162 between the supporting members 16 and the back panel 10. A protrusion 18 is formed above the holding space 162 on the back panel 10.

Figure 3:
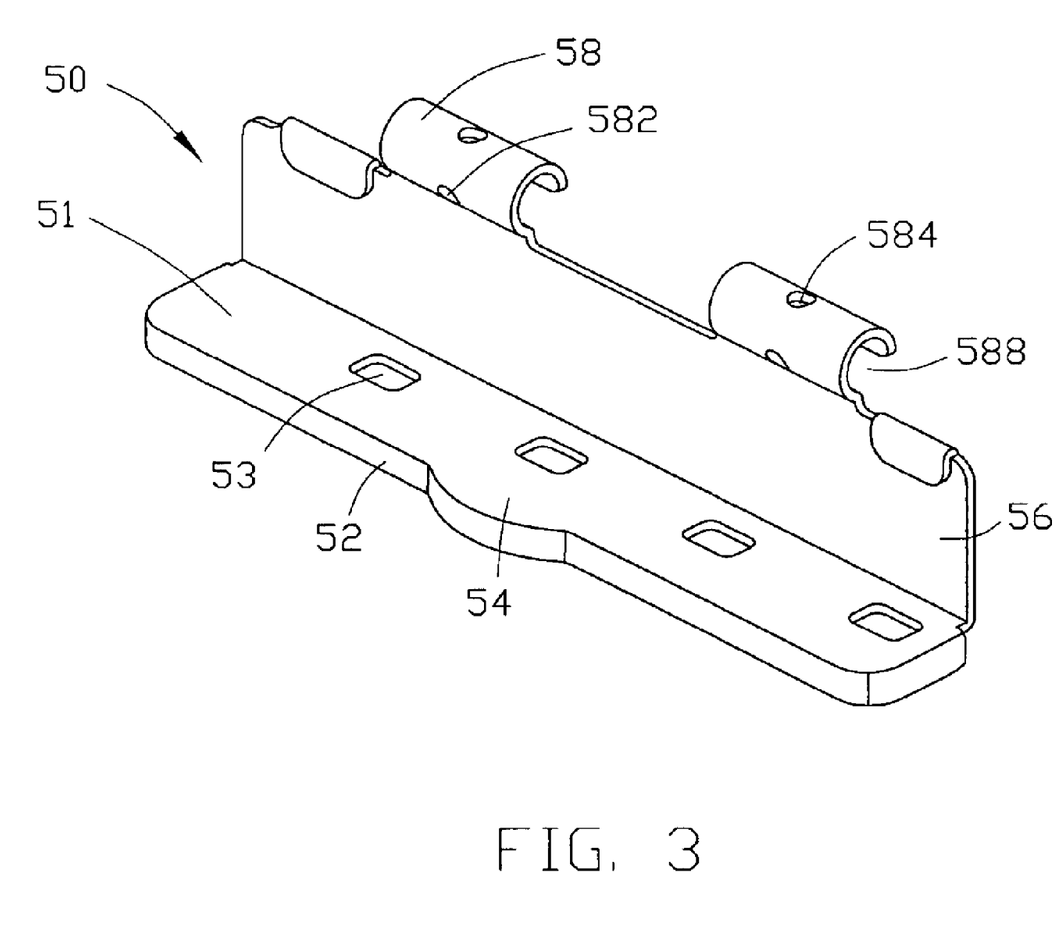
FIG. 3 is an isometric, enlarged view of the retention member of FIG. 1.

Referring also to FIG. 3, the retention member 50 includes a side wall 56, and a portion of the side wall 56 is bent perpendicularly to form a fixing portion 51. A fixing flange 52 extends along open side of the fixing portion 51. The fixing portion 51 defines a plurality of fixing openings 53, corresponding to the protrusions 126 of the back panel 10. An operating portion 54 protrudes from a middle of one side of the fixing portion 51. A pair of rolled tabs 58 extends from a top edge of the side wall 56, corresponding to the supporting members 16 of the back panel 10. The rolled tabs 58 are formed by rolling rectangular clips. The rolled tabs 58 are arcuately shaped, thereby defining a gap 588 between each distal edge of the rolled tab 58 and the side wall 56. Each rolled tab 58 defines a first and a second securing holes 582, 584 corresponding to each protrusion 18 of the back panel 10. Each first securing hole 582 and the corresponding second securing hole 584 are located along a same arc of a curved part of the rolled tab 58.

Figure 4:
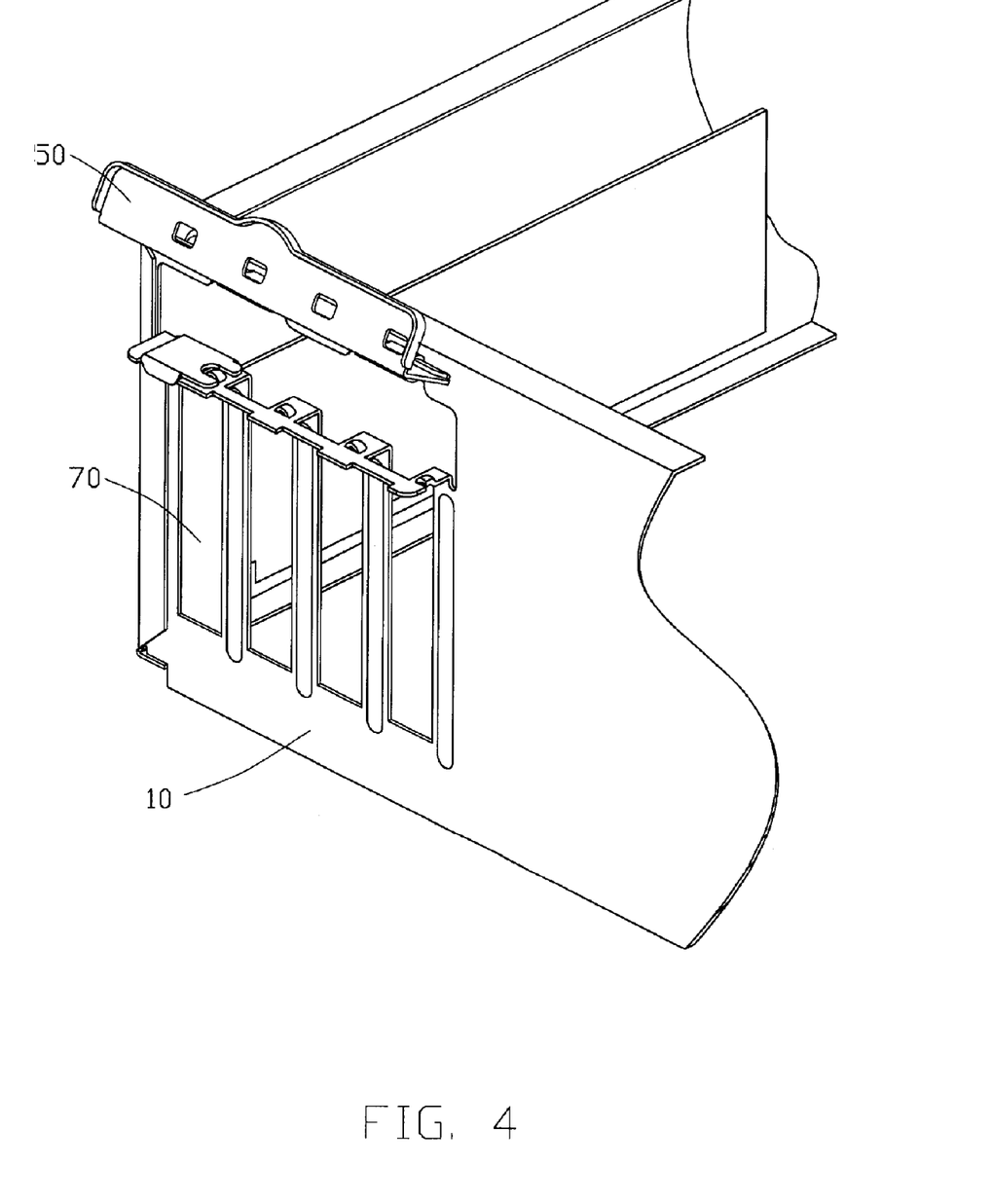
FIG. 4 is an assembled view of part of the retention member, the back panel and the expansion card of FIG. 1, showing the retention member in a unlocked position.

Referring also to FIG. 4, in assembling the retention member 50 to the back panel 10, the rolled tabs 58 of the retention member 50 are pivotably engaged with the corresponding supporting members 16 of the back panel 10 through the spaces 162 respectively. Then, the protrusions 18 of the back panel 10 abut against the rolled tabs 58 of the retention member 50 respectively.

Figure 5:
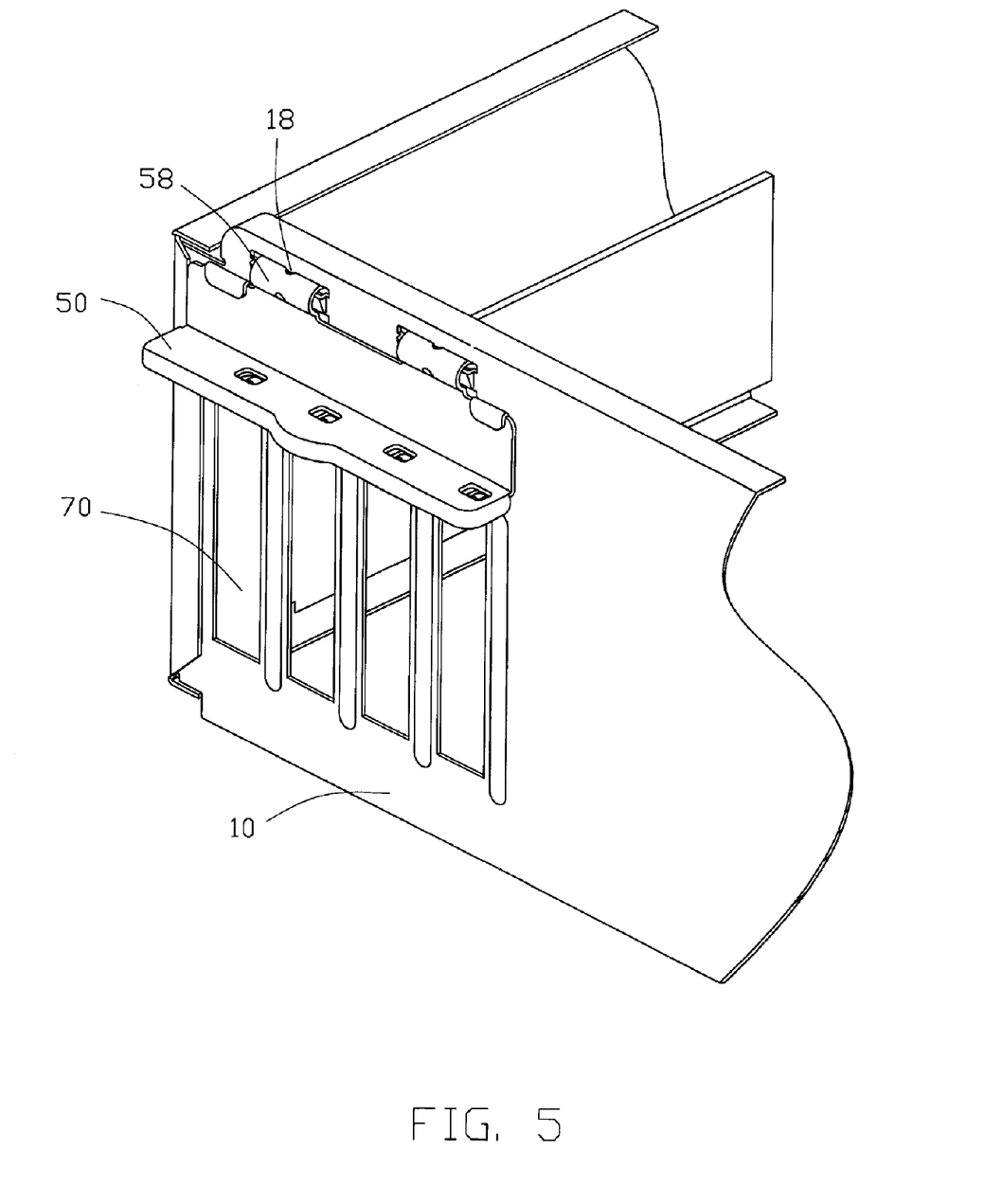
FIG. 5 is similar to FIG. 4, but showing the retention member in a locked position.
Figure 6:
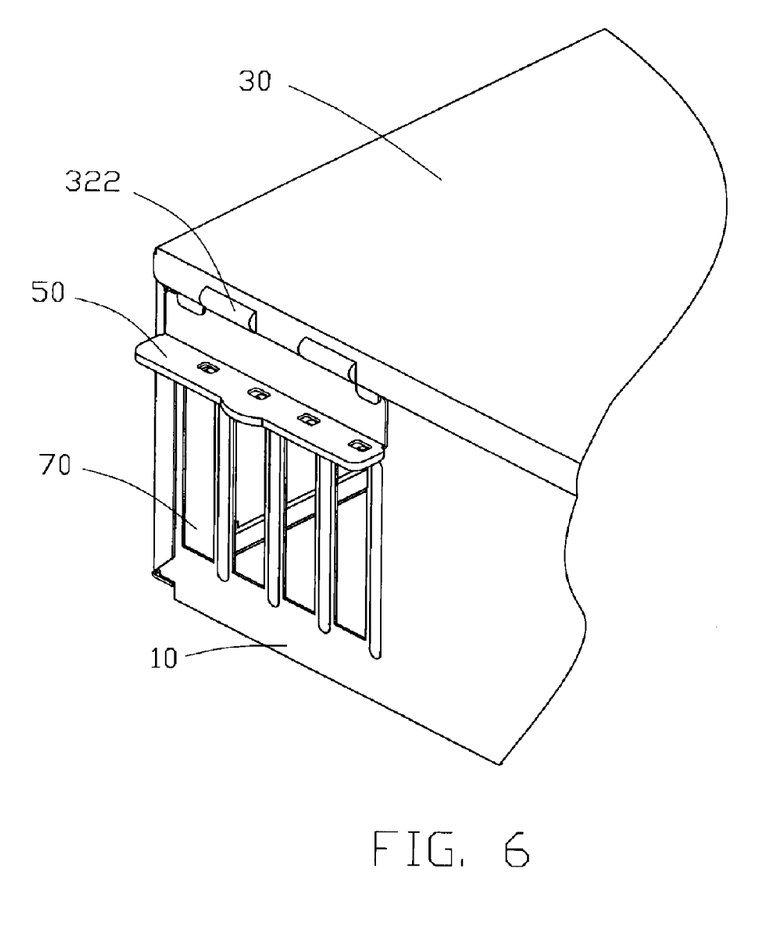
FIG. 6 is an assembled view of part of the mounting device of FIG. 1, showing the retention member in a locked position.

Referring also to FIG. 5 and FIG. 6, in securing the expansion card 70 to the back panel 10, the retention member 50 is rotated up, until the protrusions 18 of the back panel 10 are received in the corresponding first securing holes 582 of the retention member 50. Then the securing clip 72 of the expansion card 70 is positioned on the barrier 12 of the back panel 10. The top portion of the securing clip 72 is pressed against the top flange 124 of the barrier 12. As the operating portion 54 of the retention member 50 is pressed down. The protrusions 18 of the back panel 10 are disengaged from the corresponding first securing holes 582 of the retention member 50. The operation portion 54 is continuously pressed down till the fixing portion 51 presses the securing clip 72 against the top flange 124 of the barrier 12. Simultaneously, the protrusions 126 of the back panel 10 are engaged into the corresponding fixing openings 53 of the retention member 50 respectively, and the protrusions 18 of back panel 10 are received in the corresponding second securing holes 584 of the retention member 50 to prevent the retention member 50 from further rotating. The cover 30 is then secured to the back panel 10. The rolled tabs 58 of the retention member 50 are received in the covering portions 322 of the cover 30, thereby further preventing rotation of the retention member 50. Finally, the expansion card 70 is secured to the back panel 10.

In releasing the expansion card 70 from the back panel 10, the cover 30 is first removed. Then the retention member 50 is rotated up. Therefore, the protrusions 18 of the back panel 10 are disengaged from the corresponding second securing holes 584 of the retention member 50. The expansion card 70 can then be removed from the back panel 10.

Figure 7:
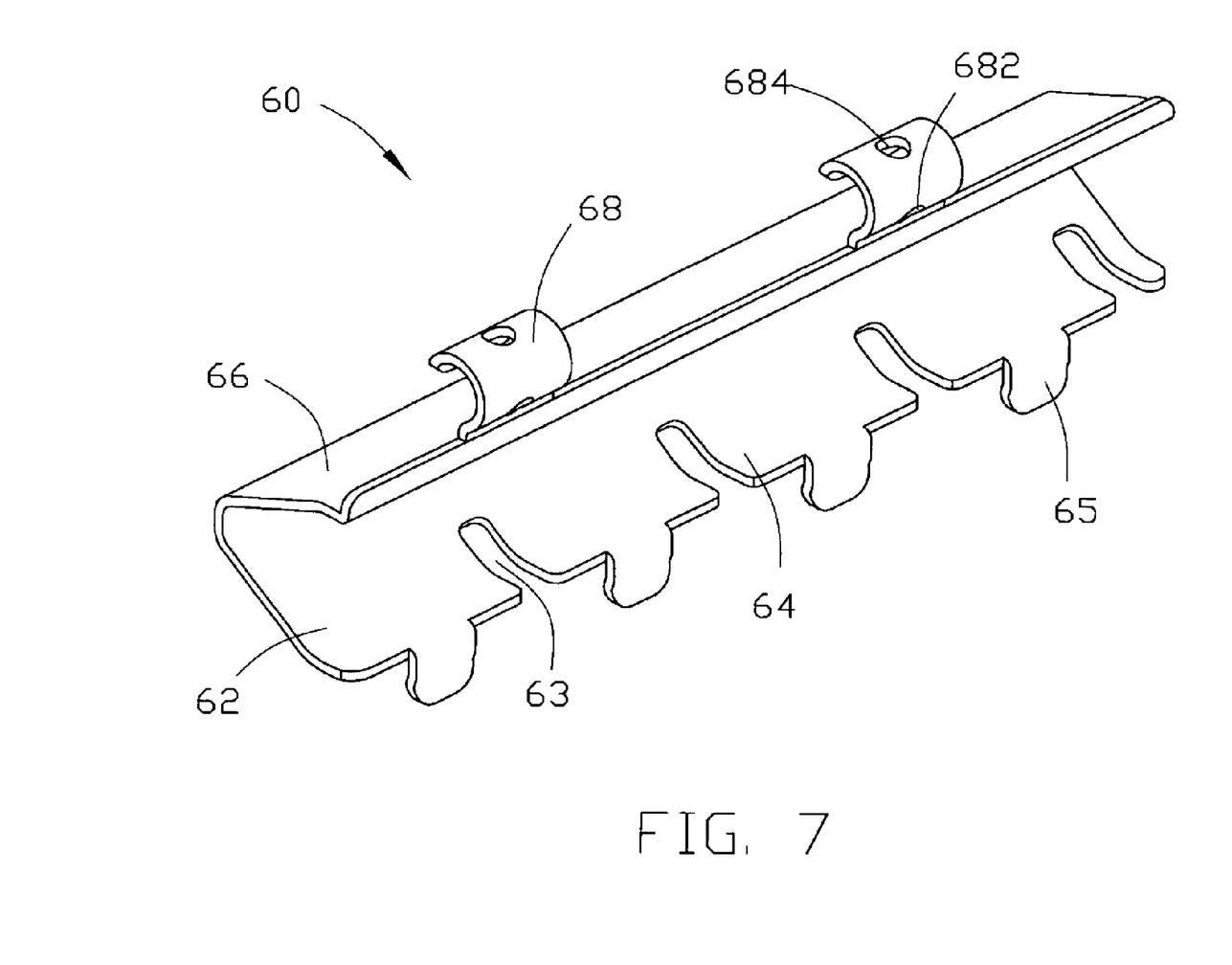
FIG. 7 is an isometric view of a retention member of another preferred embodiment of the present invention.
Figure 8:
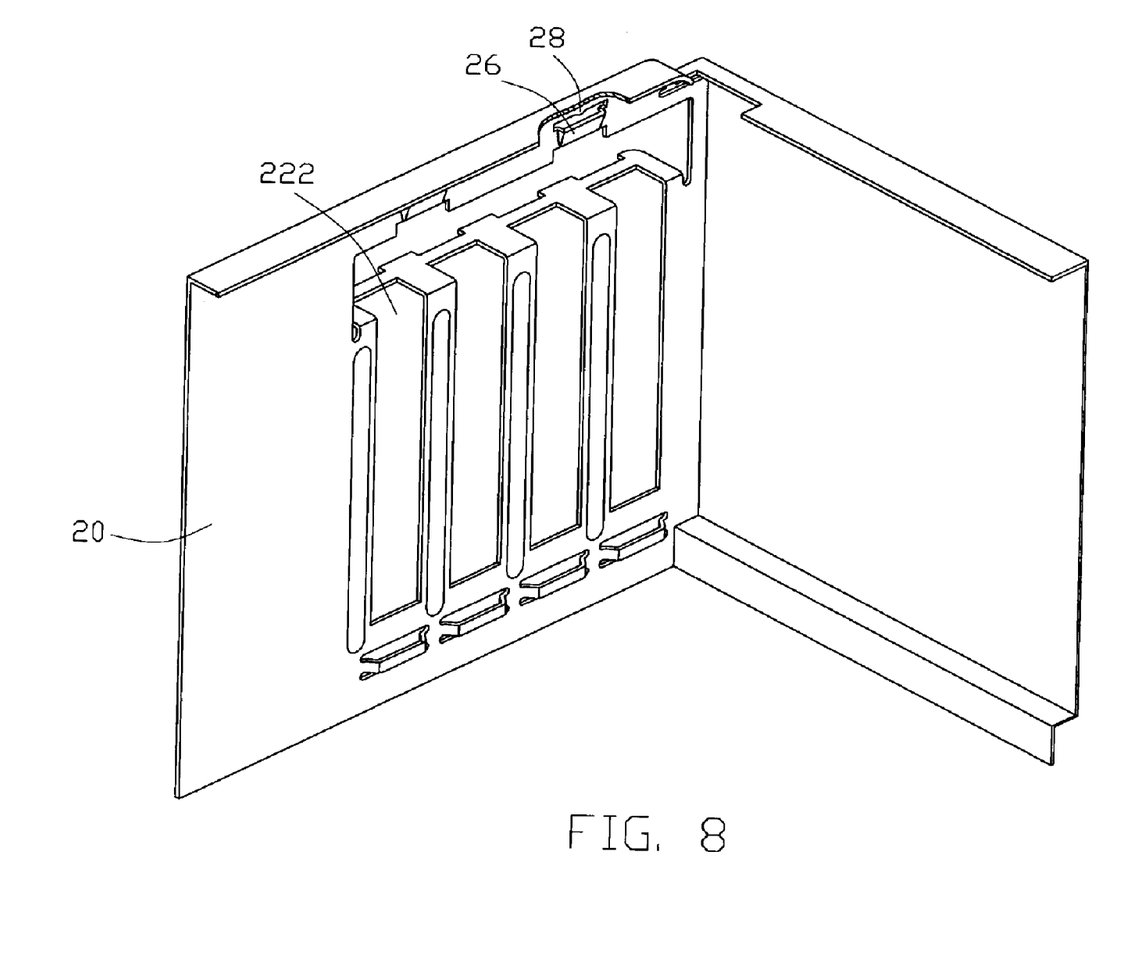
FIG. 8 is an isometric view of part of a back panel of mounting device of preferred embodiment of the present invention of FIG. 7.
Figure 9:
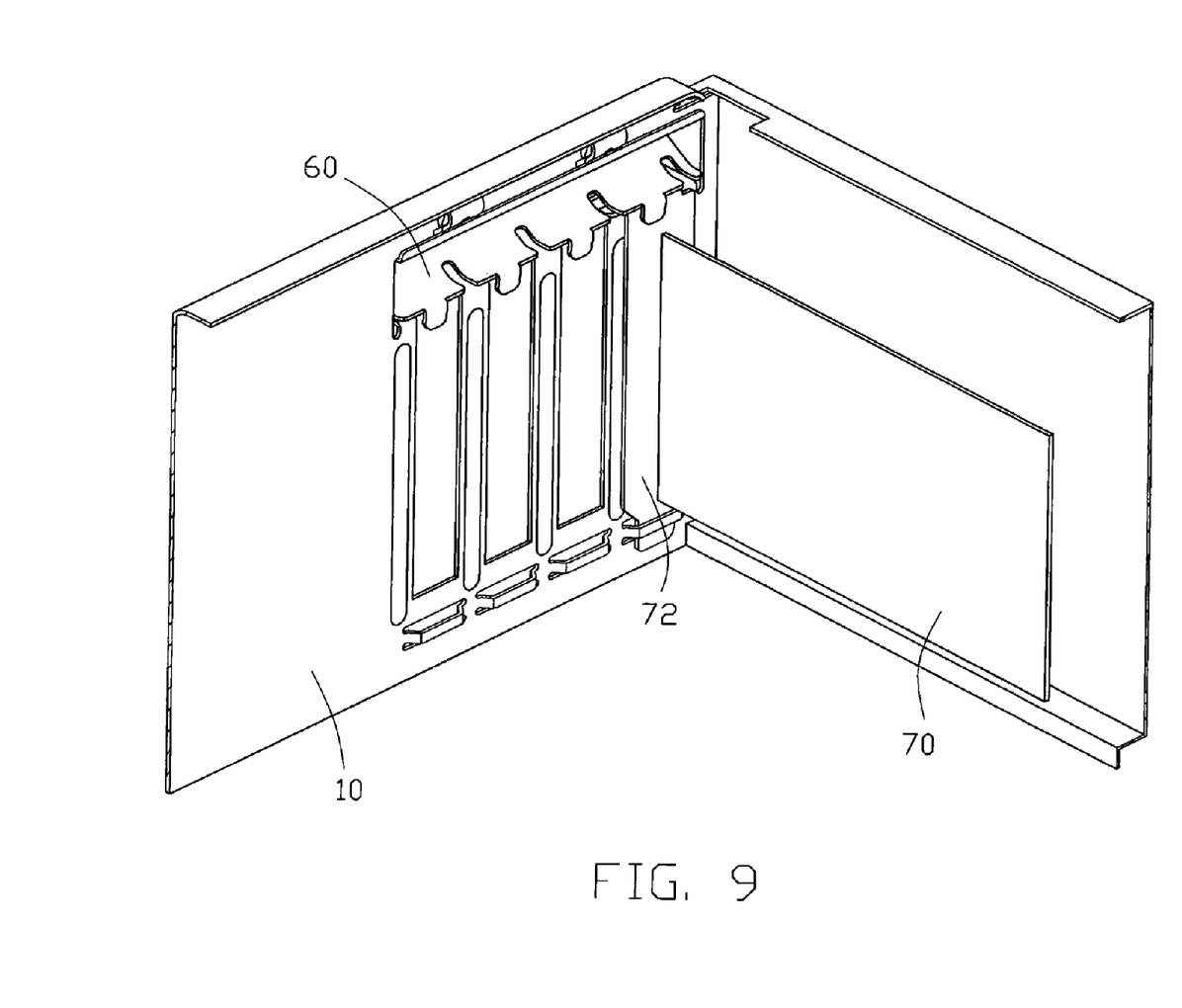
FIG. 9 is an assembled, isometric view of part of a mounting device of preferred embodiment of the present invention of FIG. 7, showing the retention member in a locked position.

Referring also to FIG. 7 to FIG. 9, in another embodiment of the present invention, a mounting device includes a retention member 60 for securing an expansion card 80 to a back panel 20 from an inner side of the back panel 20. The back panel 20 includes a plurality of slots 222, a supporting member 26, and a protrusion 28. The supporting member 26 is slanted inward on a top portion of the back panel 20. The retention member 60 is generally V-shaped, and includes a top bending portion 66 and a fixing portion 62. A pair of rolled tabs 68 extends from a top edge of the bending portion 66 corresponding to the supporting member 26 of the back panel 20. A first securing hole 682 and a second securing hole 684 are defined in each rolled tab 68 of the retention member 60. The fixing portion 62 includes a plurality of fixing clips 64, slots 63, and resilient rolled tabs 65. In securing the retention member 60, the retention member 60 is pivoted to the supporting member 26 of the back panel 20. When the retention member 60 is pivoted down, the protrusion 28 of the back panel 20 is received in the second securing hole 684 of the retention member 60. The expansion card 80 is secured by the corresponding fixing clip 64 and rolled tab 65 of the retention member 60, thereby securing the expansion card 80 to the back panel 20.

The protrusions 18, 28 of the back panels 10, 20 in the above embodiments of the present invention can also be set on the corresponding supporting members 16, 26 of the back panels 10, 20.

It is to be understood, however, that even though numerous characteristics and advantages have been set forth in the foregoing description of a preferred embodiments, together with details of the structure and function of the preferred embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A mounting assembly for an expansion card, the mounting assembly comprising:
   a first panel defining an opening with a flange located at one side of the opening, a support member formed on the first panel at an opposite side of the opening;
   a retention member located at the opening, and comprising a rolled portion engaging around the support member to pivotably attach the retention member to the first panel, a gap defined between a distal end of the rolled portion and the retention member for allowing the support member to be inserted into the rolled portion, and a fixing portion being pivotable with the retention member between a locked position where the fixing portion abuts the flange for sandwiching a securing clip of the expansion card therebetween and an unlocked position where the fixing portion locates away from the flange for releasing the securing clip; and
   a second panel attached to the first panel to lock the retention member in said locked position.

2. The mounting assembly of claim 1, wherein a protrusion is formed on one of the retention member and the rolled portion, and a securing hole is defined in the other of the retention member and the rolled portion for engagingly receiving the protrusion therein.

3. The mounting assembly of claim 1, wherein a space is formed between the supporting member and the panel for the rolled tab extending therein, a protrusion protrudes into the space, and a first and a second securing holes are formed in the rolled portion, when the protrusion is received in the first securing hole, the retention member is retained at said locked position, and when the protrusion is received in the second securing hole, the securing clip is retained in said unlocked position.

* * * * *